(12) United States Patent
Andersson

(10) Patent No.: US 10,883,337 B2
(45) Date of Patent: Jan. 5, 2021

(54) DRAIN-BACK VALVE AND METHOD

(71) Applicant: Flomatic Corporation, Glens Falls, NY (US)

(72) Inventor: Allan Bo Andersson, Cambridge, NY (US)

(73) Assignee: Flomatic Corporation, Glens Falls, NY (US)

( * ) Notice: Subject to any disclaimer, the term of this patent is extended or adjusted under 35 U.S.C. 154(b) by 184 days.

(21) Appl. No.: 16/250,461

(22) Filed: Jan. 17, 2019

(65) Prior Publication Data
US 2020/0232301 A1    Jul. 23, 2020

(51) Int. Cl.
| | |
|---|---|
| *F04B 53/12* | (2006.01) |
| *F16K 15/02* | (2006.01) |
| *E21B 34/08* | (2006.01) |
| *F04B 47/06* | (2006.01) |
| *F16K 1/32* | (2006.01) |

(52) U.S. Cl.
CPC .............. *E21B 34/08* (2013.01); *F04B 47/06* (2013.01); *F04B 53/12* (2013.01); *F16K 1/32* (2013.01); *F16K 15/026* (2013.01)

(58) Field of Classification Search
CPC .......... E21B 34/08; F04B 53/12; F04B 47/06; F04B 53/1025; F04B 53/04; F16K 1/32; F16K 15/026; F16K 31/46
See application file for complete search history.

(56) References Cited

U.S. PATENT DOCUMENTS

| | | | |
|---|---|---|---|
| 9,032,299 B2 | 5/2015 | Andersson | |
| 9,732,739 B2 * | 8/2017 | Drake | ...................... F04B 15/00 |

* cited by examiner

Primary Examiner — Rick K Chang
(74) Attorney, Agent, or Firm — Heslin Rothenberg Farley & Mesiti P.C.

(57) ABSTRACT

A drain-back valve is provided for draining a submersible pump system in a water well. The drain-back valve includes, for example, a body, an end cap and a plunger assembly. The end cap is inserted into one end of the body includes at least one port that is in fluid communication with an interior passageway of the body. The plunger assembly engages the opposing end of the body. When closed, the plunger assembly prevents water from flowing into the interior passageway of the body. The drain-back valve is activated or opened by dropping a weight into a riser or drop pipe. The weight strikes the plunger assembly and opens the drain-back valve to allow water to flow through the body and out the end cap. This allows well water in the drop or riser pipe to drain back into the water well. With this water drained from the drop or riser pipe, a pump service personnel on the ground surface is able to pull up the pump without the water weight that was in the drop or riser pipe. After servicing and before re-installation back into the well, the drain-back valve is reset to its normally closed position.

20 Claims, 14 Drawing Sheets

DRAIN-BACK VALVE AND METHOD

TECHNICAL FIELD

This invention relates generally to the field of valves, and more specifically, to drain-back valves for a well system.

BACKGROUND OF THE INVENTION

Well systems (or wells) are often used to extract water from underground. Traditionally, such well systems will include a submersible pump disposed in the well, a check valve connected to the pump, and a riser pipe connected to the check valve and extending to the ground surface. Typically, conventional check valves, used to protect the pump from back flow, are designed for only one way flow, and do not allow for any drain-back of fluid. This means that, when the pump needs to be serviced, removal of the pump and riser pipe, for example, is cumbersome and messy because of the weight of the water is trapped in the riser pipe.

Attempts have been made to provide valves that allow for drain-back of fluid back into the well. In these prior attempts, break-off plugs are installed in the check valve in order to drain the riser pipe when the pump is turned off. The break-off plugs are designed to break off when a weight is dropped down the riser pipe to allow water to escape thru a bypass port in the side wall of the check valve and drain-back into the well. However, conventional break-off plugs need to replaced each time the pump is pulled from the well for servicing.

SUMMARY OF THE INVENTION

The shortcomings of the prior art may be alleviated by using a drain-back valve in accordance with one or more principles of the present invention. The drain-back valve of the present invention may be installed below the frost line in a water well drop pipe inside a well casing or in the water well drop pepe below or at the well's static water level. Additionally, other uses may be made of the invention that fall within the scope of the claimed invention but which are not specifically described below.

In one aspect of the invention, there is provided a drain-back valve. The drain-back valve includes a body, an end cap, and a plunger assembly. The body includes a passageway and a central longitudinal axis. The passageway includes an inlet, an inlet end forming a valve seat, an outlet, and a peripheral inner surface. The end cap is inserted into the outlet of the body. The end cap includes at least one port extending through the end cap and in fluid communication with the passageway. The plunger assembly includes a central longitudinal axis. A portion of the plunger assembly extends through the inlet of the body and into the passageway. The plunger assembly is moveable between a closed position that prevents fluid flow through the inlet of the body and an open position that allows fluid flow through the inlet to the outlet of the body. The plunger assembly includes a plunger guide, a plunger and a rubber disk. The plunger guide is positioned substantially within the passageway of the drain-valve body. The plunger guide includes a head and a stem extending from the head towards the outlet of the body. The plunger guide is biased away from the inlet end of the body. The plunger includes a first end and a second end. The first end of the plunger is affixed to the head of the plunger guide. The second end of the plunger extending outward from the inlet end of the body. The rubber disk is positioned between the head of the plunger guide and the first end of the plunger. The rubber disk is biased against the valve seat formed on the inlet end of the body in the closed position. At least a portion of the rubber disk is dislodged from the valve seat formed on the inlet end of the body in the open position.

In other aspects, the drain-back valve is inserted into a bypass port formed in an outer wall of a component in a water well pump system, including, for example, a connector pipe (e.g. T-shaped connector), a check valve or a riser or drop pipe.

Additional features and benefits will become apparent from the following drawings and descriptions of the invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the end of the specification. The foregoing and other objects, features, and advantages of the invention are apparent from the following detailed description taken in conjunction with the accompanying drawings in which:

DETAILED DESCRIPTION OF EMBODIMENTS OF THE INVENTION

Figure 1A:
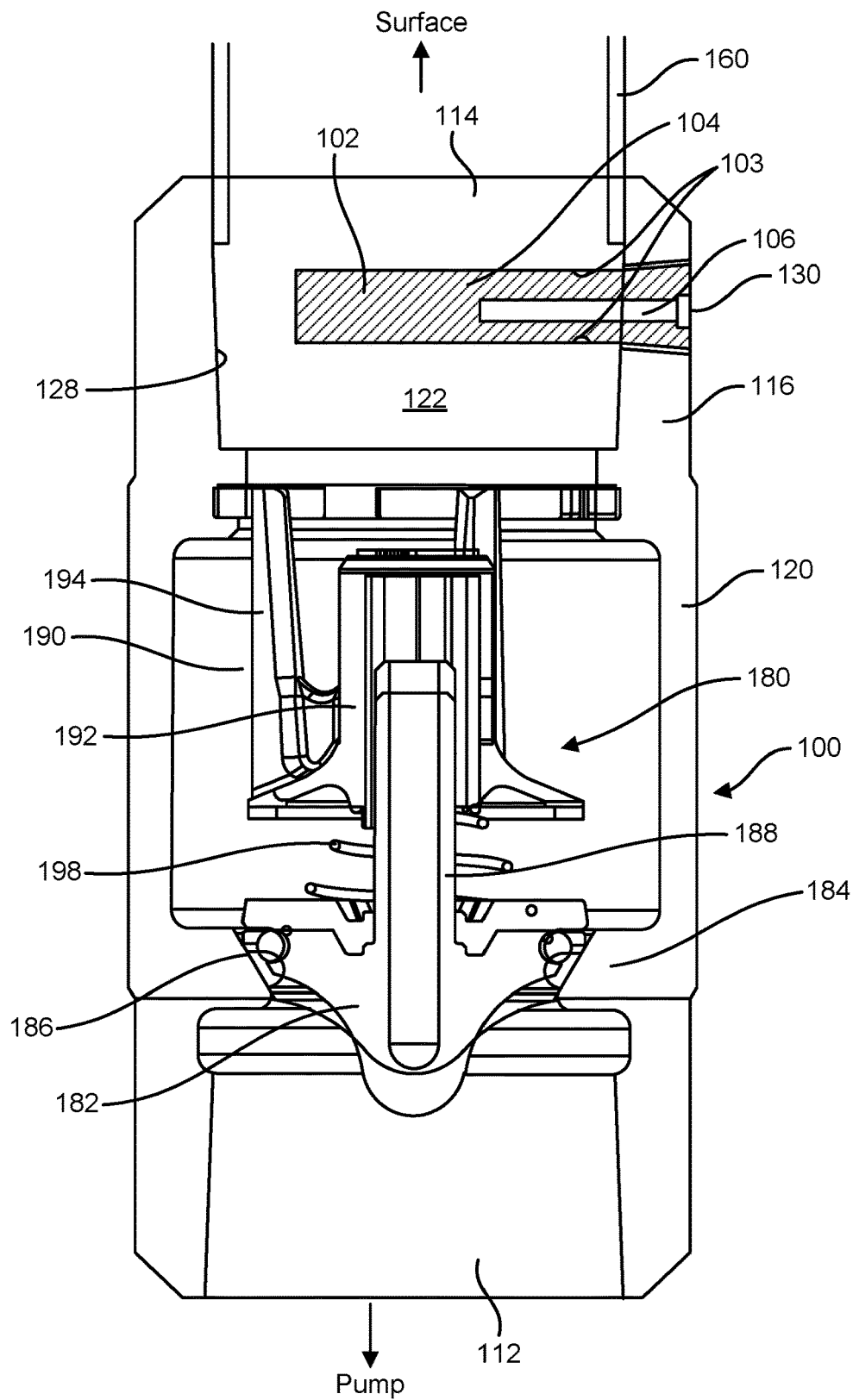
FIG. 1A depicts a cross-sectional view of a prior art check valve incorporating a prior art break-off plug.

For the purposes of promoting an understanding of the principles of a valve designed and constructed in accordance with one or more aspects of the present invention, reference will now be made to the embodiments, or examples, illustrated in the drawings and specific language will be used to describe these. It will nevertheless be understood that no limitation of the scope of the invention is thereby intended. Any alterations and further modifications in the described embodiments, and any further applications of the principles of the invention as described herein are contemplated as would normally occur to one skilled in the art to which the check valve invention relates.

Presented herein is an improved drain-back valve that does not have to be replaced each time a pump is pulled from a well for servicing or replacement. In one embodiment, the improved drain-back valve includes a body, an end cap and a plunger assembly. The end cap is inserted into one end of the body includes at least one port that is in fluid communication with an interior passageway of the body. The plunger assembly engages the opposing end of the body. When closed, the plunger assembly prevents water from flowing into the interior passageway of the body. The drain-back valve is activated or opened by dropping a weight into the water well riser or drop pipe. The weight strikes the plunger assembly and opens the drain-back valve to allow water to flow through the body and out the end cap. This allows well water in the drop or riser pipe to drain back into the water well. With this water drained from the drop or riser pipe, a pump service personnel on the ground surface is able to pull up the pump without the water weight that was in the drop or riser pipe. After servicing and before re-installation back into the well, the improved drain-back valve is reset to its normally closed position.

A drain-back valve constructed in accordance with one or more aspects of the present invention may be installed in, for example, the housing of a check valve, a riser or drop pipe, or a connector that connects a check valve to a riser pipe or two riser pipe portions together. The drain-back valve may be installed below the frost line or below or at the well's static water level.

Figure 1B:
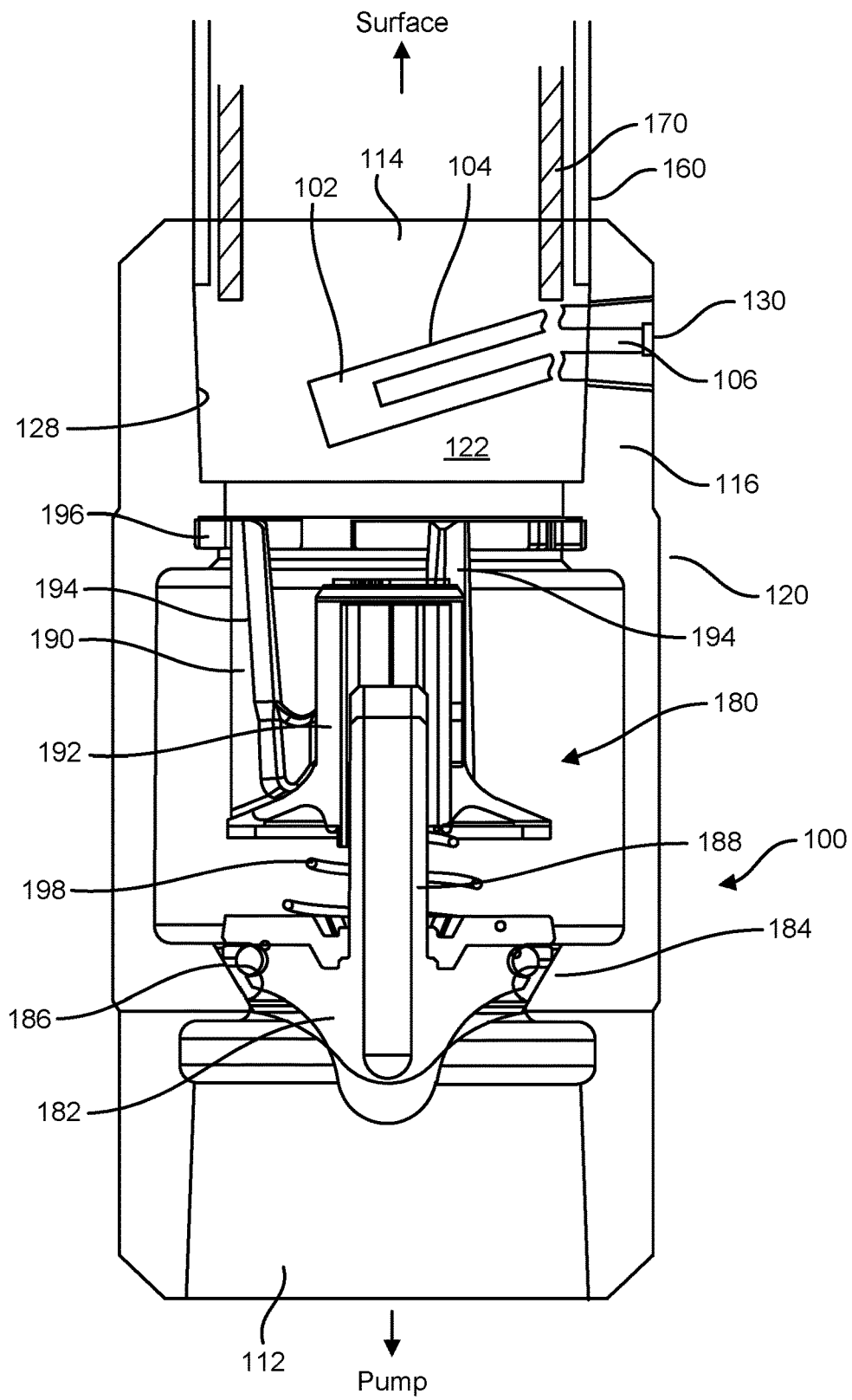
FIG. 1B depicts a cross-sectional view of the prior art check valve illustrated in FIG. 1A after insertion of a weight dropped from the well surface that severs the break-off plug.

FIGS. 1A and 1B illustrate a typical check valve 100 having a prior art break-off plug 102 used in a water well system and the problems associated with such a configuration. A water well system typically includes a well casing (not shown), which may be composed of such substances as steel, plastic or the like, covers and protects most, if not all, of the vertical sidewalls of the well. A submersible pump (not shown) is disposed within the bottom of the well and is submerged in the water. An outlet of the pump (note shown) is connected to an inlet 112 of a prior art check valve having a break-off plug 102.

A riser pipe 160 is vertically disposed in the well and connected to an outlet 114 of the check valve. In one example, riser pipe 160 may be six inches in diameter or larger and may be a hundred feet or more long, or may include a plurality of sections that are twenty feet long. As such, riser pipe 160 can hold a substantial volume of water above the check valve 100 and exert several hundreds of pounds per inch (psi) pressure on check valve 100. Check valve 100 is designed to protect the pump from this water pressure and from backflow of water down riser pipe 160 into an outlet of the pump, which could damage the bearings and other internal components of the pump.

At times, the submersible pump needs to be serviced or replaced. In order to service or replace the pump, the pump needs to be removed from the well. However, the weight of the pump and water within riser pipe 160 may be too heavy for someone at ground level to pull up. As a result, break-off plugs 102 have been installed in some conventional check valve in order to drain riser pipe 160 when the pump is turned off and pulled from the well. Break-off plugs 102 are designed to break off when a weight 170 is dropped down riser pipe 160 and leave a bypass port 130 in the sidewall 116 of check valve 100. As illustrated in FIG. 1B, weight 170 strikes break-off plug 102 and allows water to drain back into the water well through bypass port 130. The use of a break-off plug 102 and bypass port 130 simplifies the pulling and servicing of the submersible pump when lifted to the surface. However, conventional break-off plugs 102 have to be replaced each time the pump is pulled from the well for servicing. Occasionally, the break-off plug 102 is missed by the weight or not completely broken off.

As shown in FIG. 1A, a conventional check valve 100 having a break-off plug 102 has a valve body 120 defining a passageway 122 therethrough. The passageway 122 has an inlet 112, an outlet 114 and a peripheral inner surface 128 circumferentially disposed around a central axis of valve body 120. Inlet 112 of passageway 122 is connected to an outlet of the pump. Outlet 114 of passageway 122 is connected to riser pipe 160. A main poppet valve assembly 180 may be disposed in passageway 122 and moveable between a closed position (depicted in FIGS. 1A-1B) which prevents fluid flow from outlet 114 to inlet 112 and an open position which allows fluid flow from inlet 112 to outlet 114. Main poppet valve assembly 180 is typically biased in a closed position by a spring 198.

Main poppet valve assembly 180 may include a poppet disk 182, which sealingly engages with an annular flange 184. Annular flange 184 is disposed on inner peripheral surface 128 of passageway 122 proximate inlet 112 and has a poppet valve seat 186. Poppet valve seat 186 may be in the form of a flange "O" ring groove. Main poppet valve assembly 180 may also include a stem 188 extending from poppet disk 182. Poppet disk 182 is resiliently biased by spring 198 to sealingly engage against poppet valve seat 186 when main poppet valve assembly 180 is in the closed position. Poppet disk 182 is disengaged from poppet valve seat 186 when main poppet valve assembly 180 is in the open position.

Main poppet valve assembly 180 may also include a guide 190. Guide 190 includes a sleeve 192, which telescopically engages stem 188 as disk 182 reciprocates from the closed position to the open position. Guide 190 may also include support arms 194 extending radially from sleeve 192. The distal ends of support arms 194 include tabs 196 that are disposed in an annular groove within the peripheral surface 128 of passageway 122, just downstream of annular flange 184. The tabs are sized to fit within the annular groove to rigidly mount guide 190 within passageway 122.

Valve body 120 of a conventional check valve 100 may also include a bypass port 130 extending substantially radially to the central axis from inner surface 128 of passageway 122 to an outer surface of the valve body 120. Bypass port 130 is positioned in the upstream portion of check valve 100. Bypass port 130 may be drilled into valve body 120 upstream of main poppet valve assembly 180 to allow fluid to drain out of check valve 100 and into the well.

As illustrated in FIG. 1A, break-off plug 102 may be installed in bypass port 130 to prevent water from draining out of valve 100 and into the well. A typical break-off plug 102 may consist of a cylindrical body 104 having a first end and a second end. The first end of break-off plug 102 is inserted through bypass port 130 radially extend toward the central axis of valve body 120. The second end is sized to firmly fit within and be retained by bypass port 130. Break-off plug 102 also has an internal cavity 106 extending longitudinally from second end into the cylindrical body 104, but does not extend all the way to the first end.

FIG. 1B illustrates the operation of a conventional break-off plug 102 to allow water to drain back into the well. As shown, a weight 170, such as, for example, a water well drop pipe is dropped from the well surface down riser pipe 160. Weight 170 strikes break-off plug 102 and shears off a portion of cylindrical body 104 in a thin section 103. After break-off plug 102 is broken, passageway 122 is in fluid communication with internal cavity 106 formed in the cylindrical body 104 of break-off plug 102. This allows water in the riser pipe to drain from the passageway 122, through internal cavity 106 of break-off plug 102 and out bypass port 130 and into the water well.

Figure 2A:
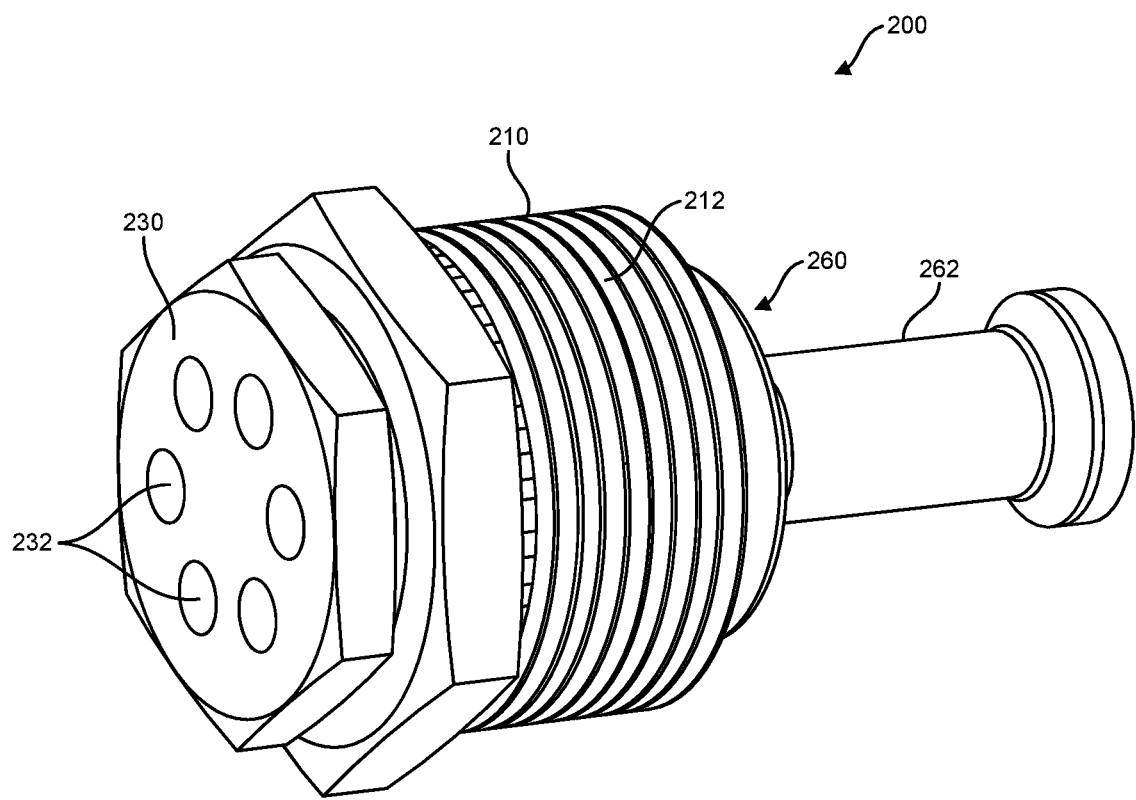
FIG. 2A depicts a perspective view of one embodiment of a drain-back valve constructed in accordance with one or more aspects of the present invention.
Figure 2B:
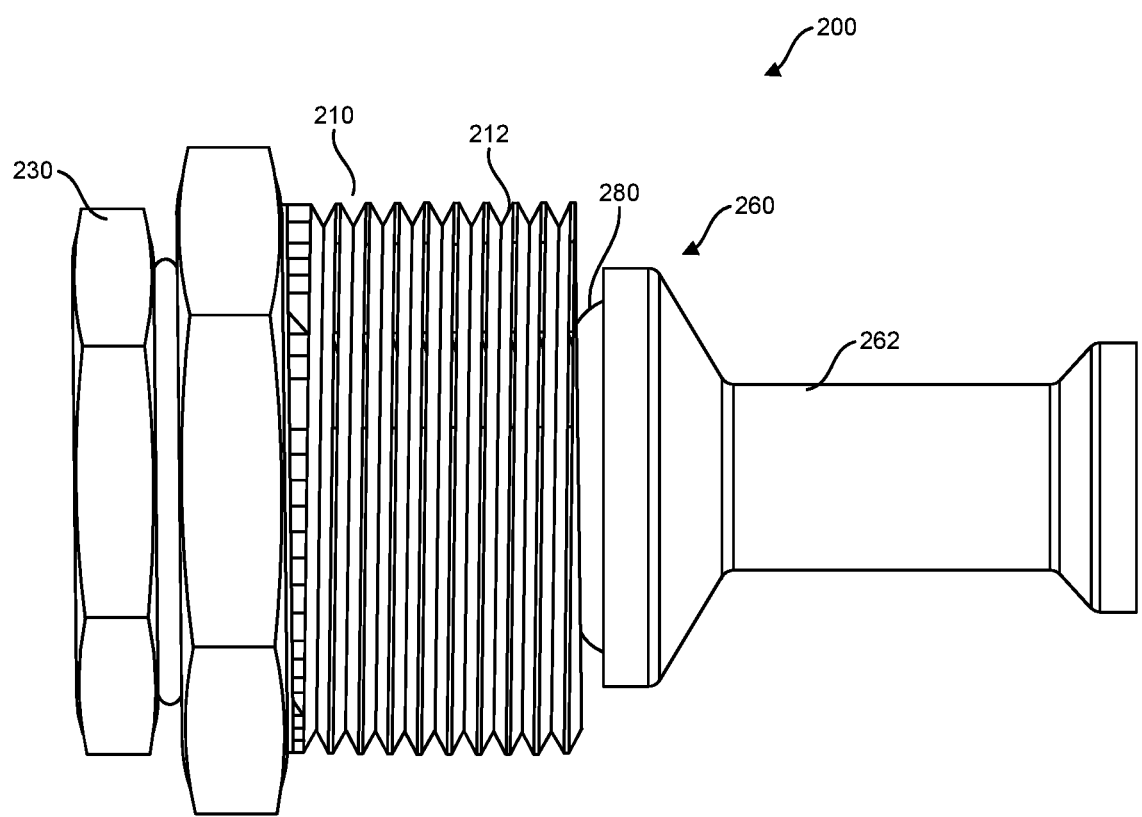
FIG. 2B depicts a side view the drain-back valve illustrated in FIG. 2A constructed in accordance with one or more aspects of the present invention.
Figure 2C:
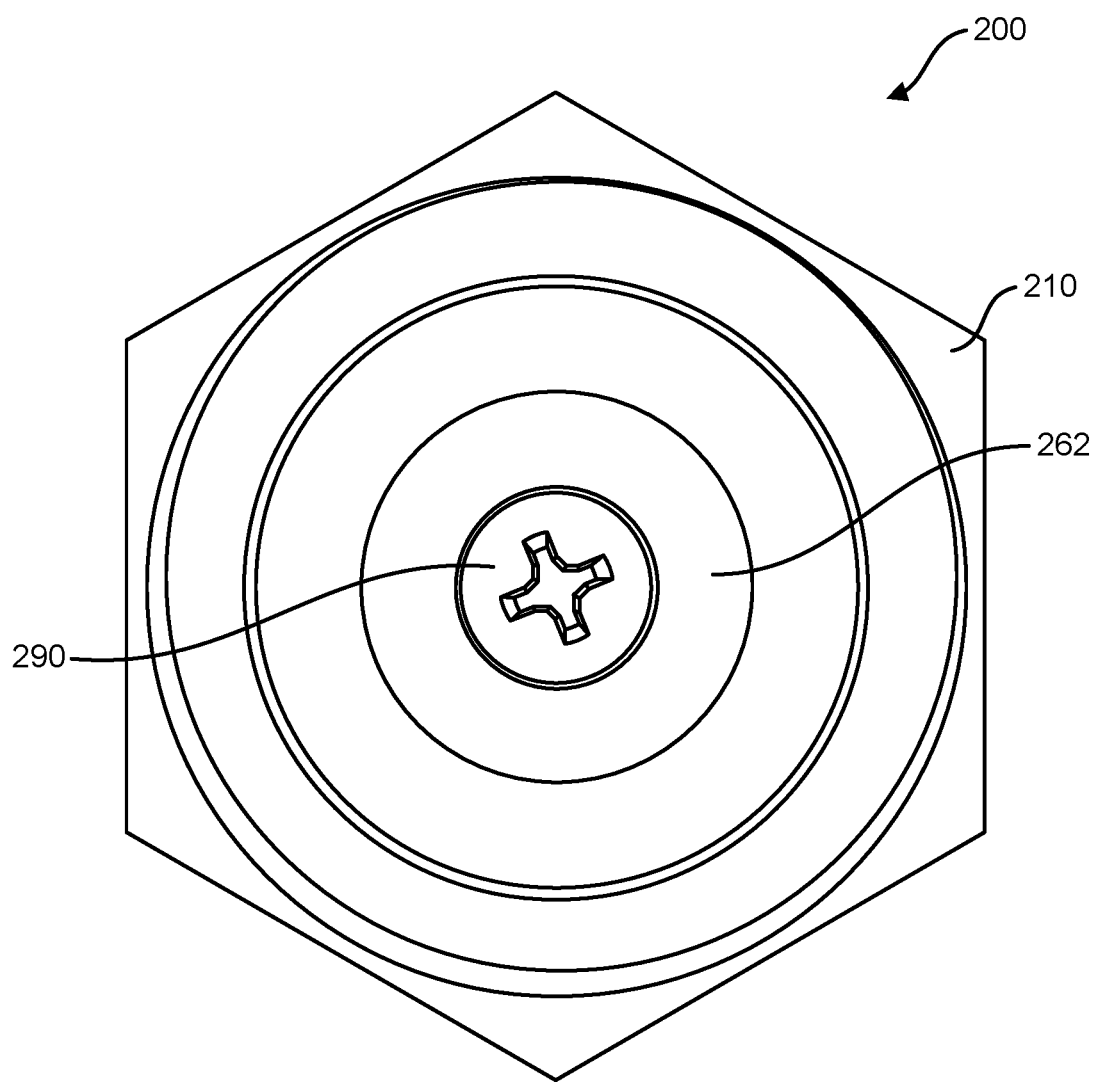
FIG. 2C depicts a first end view the drain-back valve illustrated in FIG. 2A constructed in accordance with one or more aspects of the present invention.
Figure 2D:
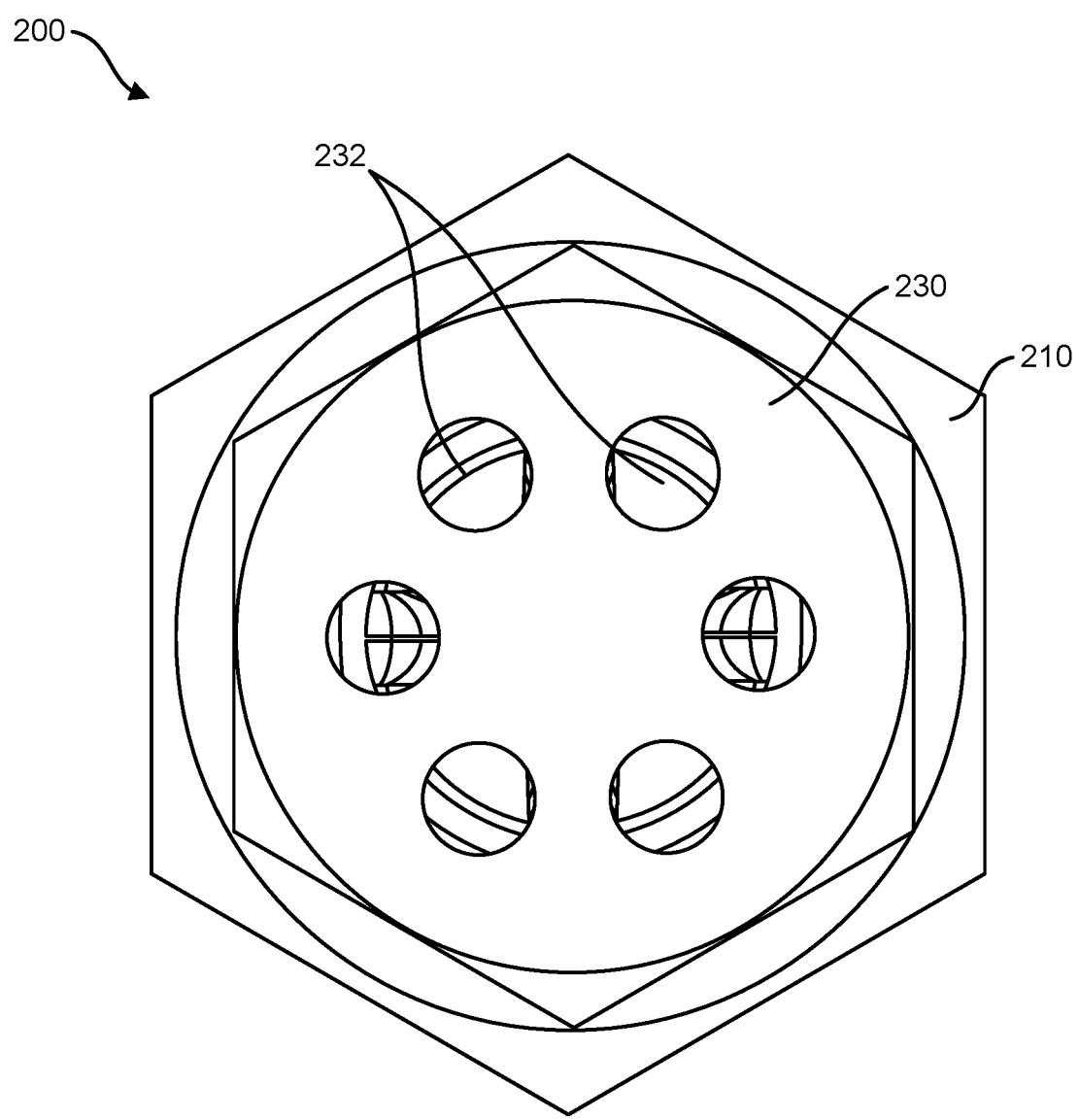
FIG. 2D depicts second end view the drain-back valve illustrated in FIG. 2A constructed in accordance with one or more aspects of the present invention.
Figure 3:
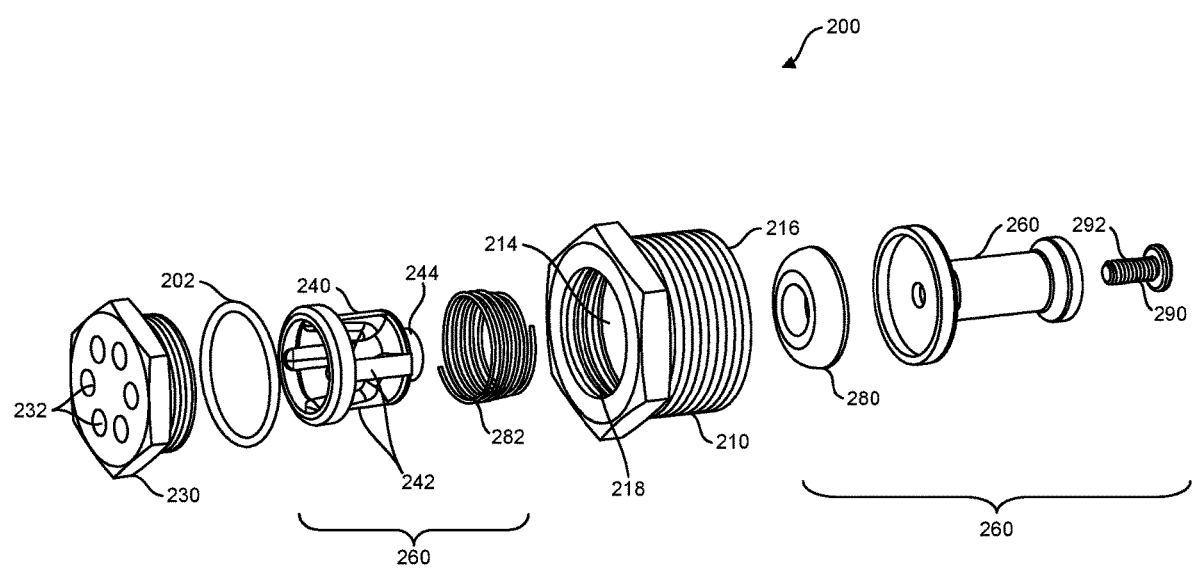
FIG. 3 depicts an exploded view of the drain-back valve illustrated in FIGS. 2A-2D constructed in accordance with one or more aspects of the present invention.

FIGS. 2A-3 illustrate an exemplary embodiment of a drain-back valve 200 constructed in accordance with one or more aspects of the present invention. Unlike a conventional valve that incorporates a break away plug 102 that shears or breaks during use, a drain-back valve 200 constructed in accordance with one or more aspects of the present invention does not have to be replaced each time the pump is pulled from the well for servicing.

Drain-back valve 200 includes body 210 that may have an outer threaded surface 212. Valve body 210 includes a passageway 214 having an inlet 216, an outlet 218, a peripheral inner surface 220 (FIG. 4) circumferentially disposed around a central axis of body 210, and a central longitudinal axis 218. An end cap 230 may be screwed or threaded into outlet 218 of valve body 210. Cap 230 may include a plurality of exit ports 232 that communicate with passageway 214 of body 210.

Figure 4:
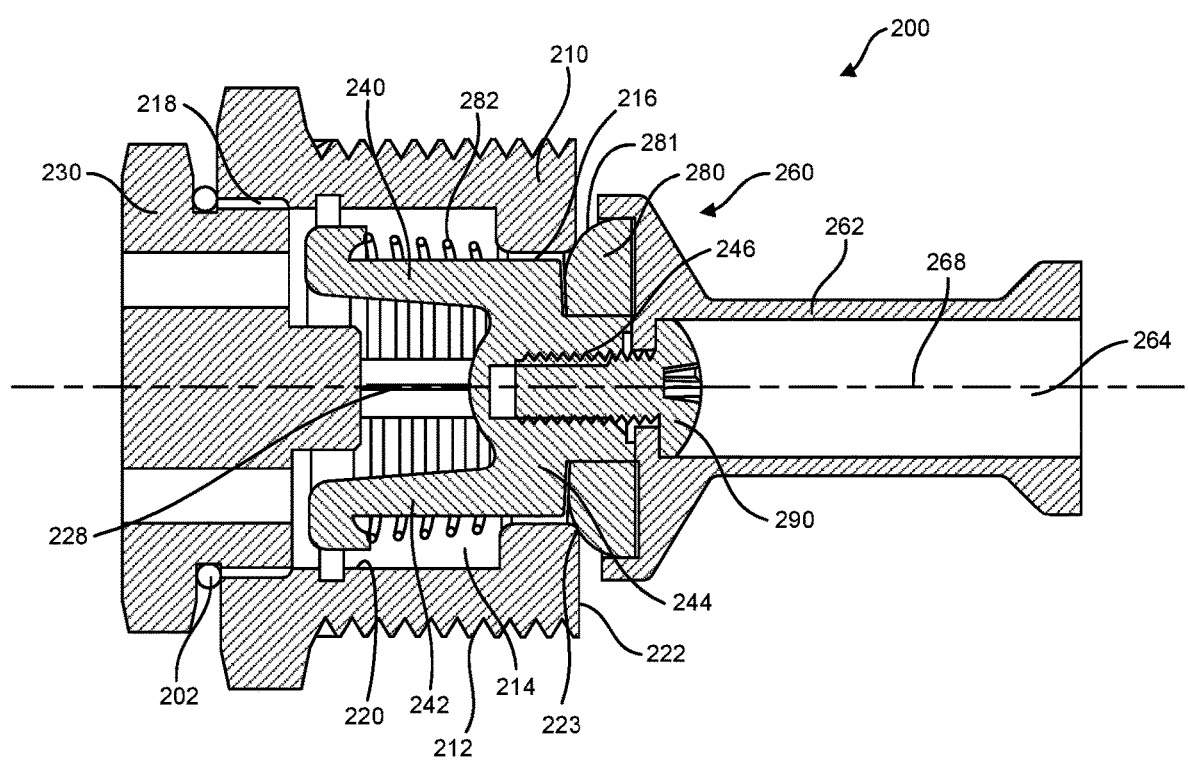
FIG. 4 depicts a cross-sectional view of the drain-back valve illustrated in FIGS. 4A-5 in a closed position constructed in accordance with one or more aspects of the present invention.

As illustrated in FIG. 3-4, a plunger assembly 260 is located at inlet 216 of drain-back valve 200. Plunger assembly 260 includes a plunger guide 240, a spring 282 that biases plunger guide 240 away from inlet 216, a plunder 260 affixed to plunger guide 240 by a fastener 290 (e.g. a screw), and a rubber disk 280 positioned between plunger guide 240 and plunger 260. Plunger assembly 260 also includes a central longitudinal axis 268. In one example, plunger guide 240 includes a base (in one example, including a plurality of guide legs 242) extending from a head portion 244. Plunger 260 extends outwardly from inlet 216 of body 210. In one example, plunger 262 includes a channel 264 that aligns with a threaded bore 246 formed in head portion 244 of plunger guide 240. Channel 264 is configured to receive fastener 290 and threaded portion 292 of fastener 290 is threaded into threaded bore 246 formed in head portion 244 of plunger guide 240.

As assembled, rubber disk 280 is biased against and sealingly engaged with end 222 (valve seat 223) of valve body 210 by spring 282 that naturally forces or biases plunger guide 240 away from end 222. In this example, end 222 provides a valve seat 223 for rubber disk 280 at inlet 216 of passageway 214. Rubber disk 280 may include a radiused edge 281, as opposed to a flat disk. With radiused edge 281, rubber disk 280 contacts valve seat 223 at, for example, one-point (e.g. circumferentially around rubber disk 280). The shape of rubber disk 280 may also allow valve 200 to re-seat itself without leakage after each operation. In one example, plunger assembly 260 is properly situated with drain-back body 210 when the central longitudinal axis 268 of plunger assembly 260 aligns with the central longitudinal axis 228 of drain-back body 210, as illustrated in FIG. 5.

Figure 5:
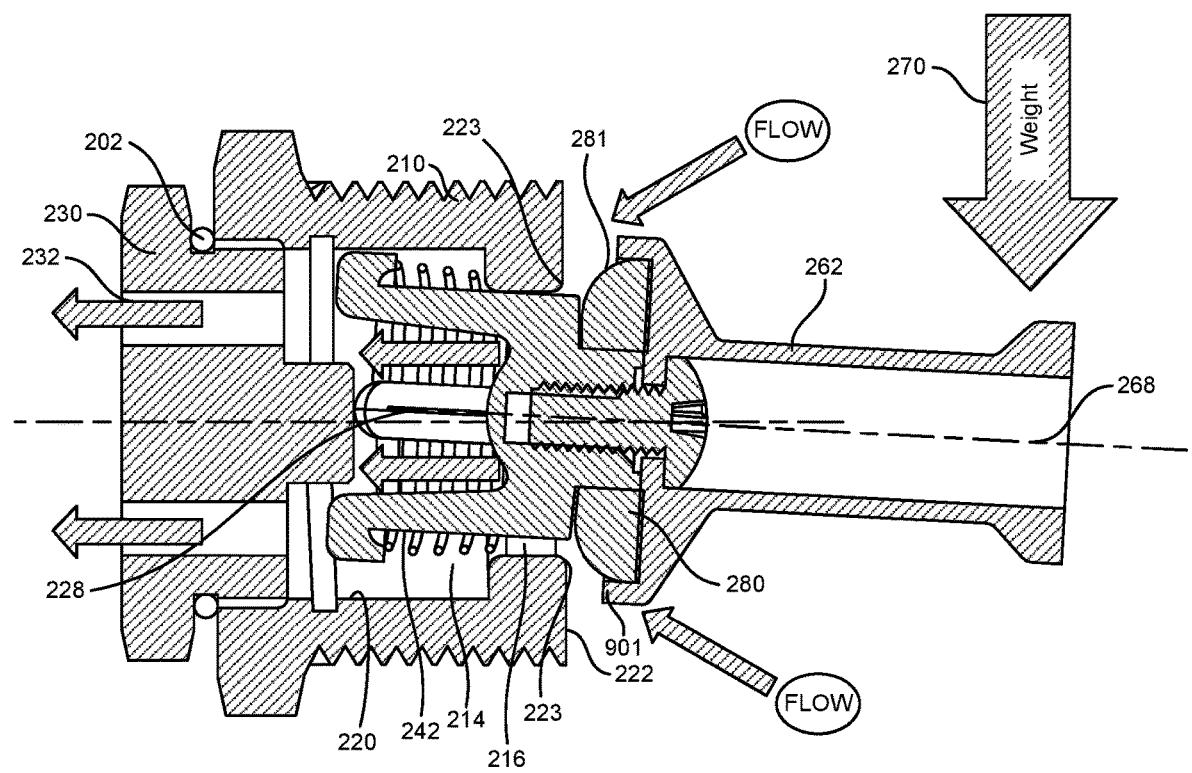
FIG. 5 depicts a cross-sectional view of the drain-back valve illustrated in FIGS. 4A-5 in an open position constructed in accordance with one or more aspects of the present invention.

In one embodiment illustrated in FIG. 5, plunger 262 of plunger assembly 260 may be equipped with an edge surface 901 that includes a number of purposes. For example, edge surface 901 retain rubber disc 280 and prevents extrusion of rubber disc 280 in inlet 216 under high pressure conditions. Edge surface 901 also serves as a stop when weight 270 is dropped to the tilting of plunger 262 on longitudinal axis 268.

FIG. 4 illustrates one embodiment of an assembled drain-back valve 200 constructed in accordance with one or more aspects of the present invention in a closed position and FIG. 5 illustrates the drain-back valve 200 in an opened position. In operation, drain-back valve 200 is activated when a weight 270 is dropped down into a water well riser or drop pipe 160. When a weight (similar to 170) strikes plunger 260, at least a portion of rubber disk 280 is dislodged from and disengaged with the valve seat at end 222 allowing fluid to flow into passageway 214 of body 210 through inlet 216 and out outlet 218 through the plurality of ports 232 in cap 230 secured with O-ring 202, as indicated by flow arrows. In an open position, central longitudinal axis 228 of drain-back valve body 210 is misaligned with central longitudinal axis 268 of plunger assembly 260, as illustrated in FIG. 5.

Figure 6A:
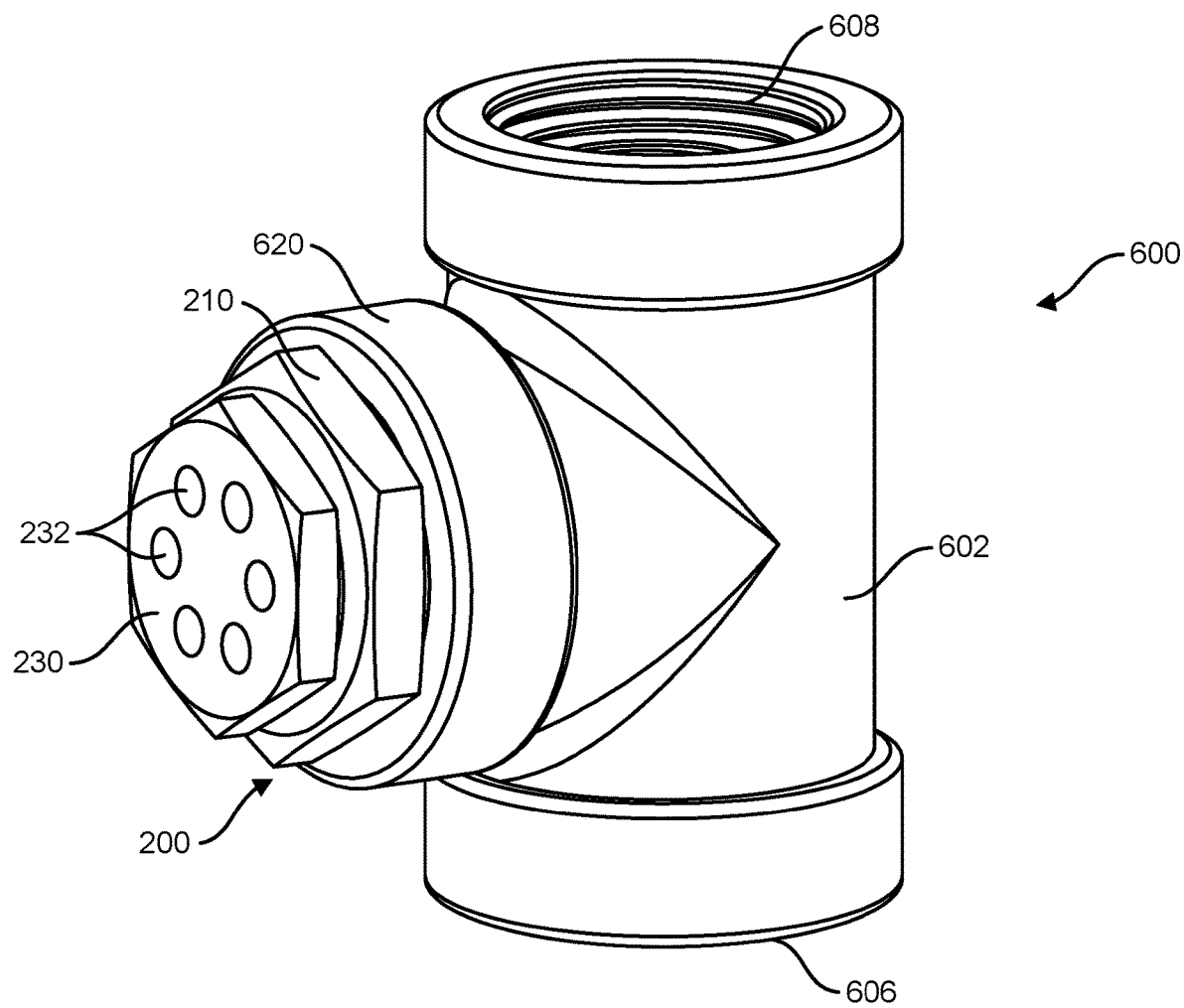
FIG. 6A depicts a perspective view of one embodiment of a drain-back valve constructed in accordance with one or more aspects of the present invention installed in a T-shaped connector.
Figure 6B:
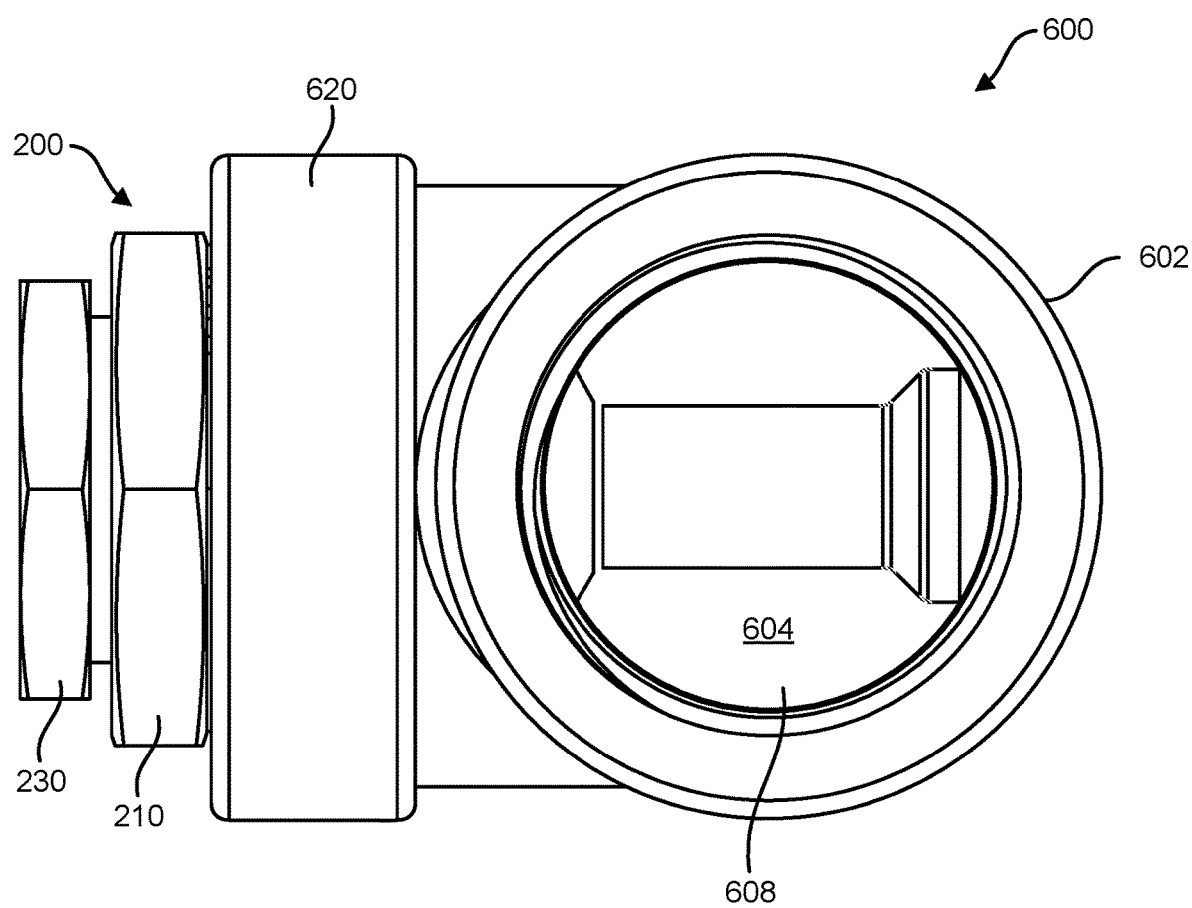
FIG. 6B depicts a top view of the drain-back valve and T-shaped connector shown in FIG. 6A.
Figure 6C:
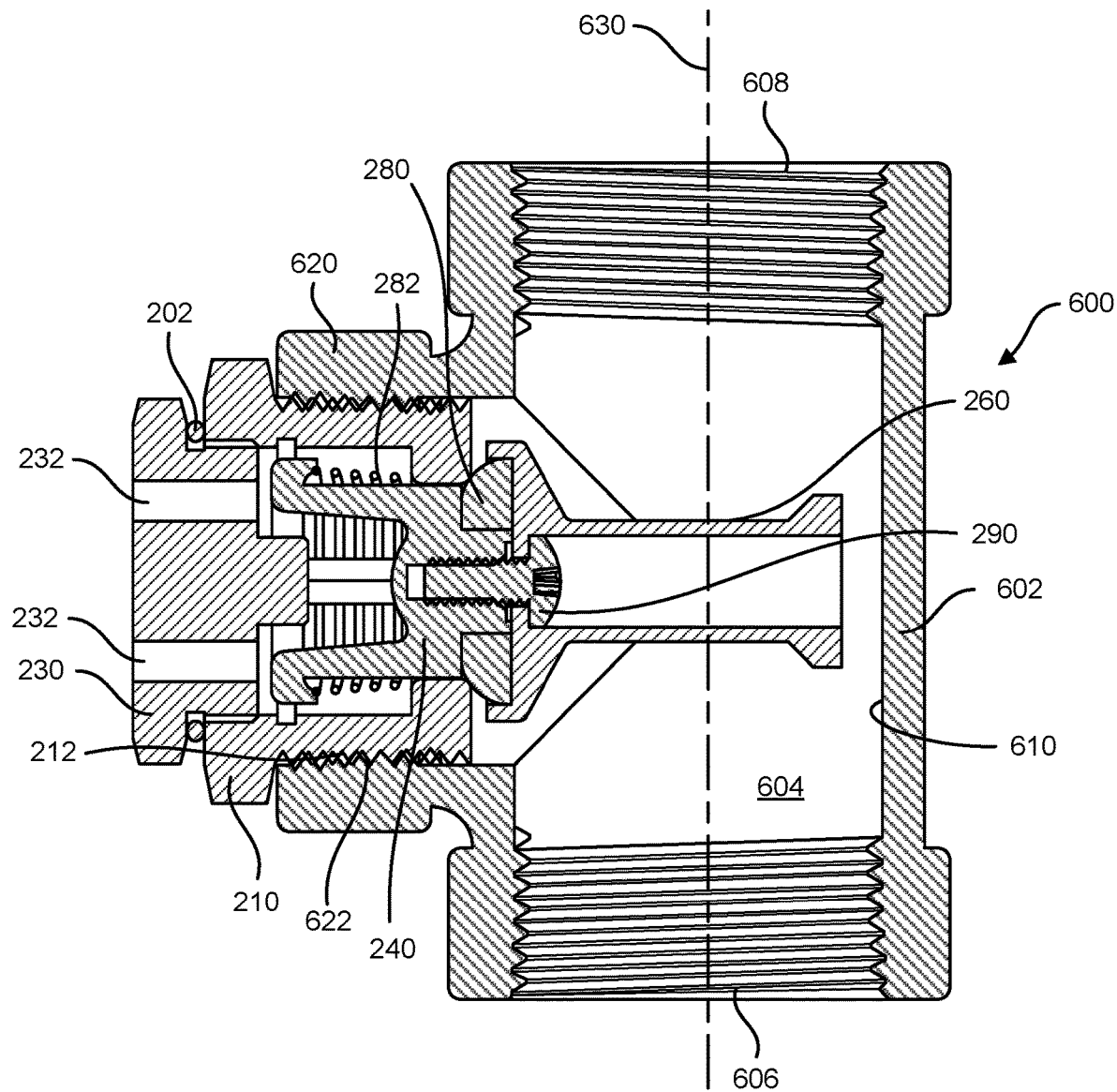
FIG. 6C depicts a cross-sectional view of the drain-back valve and T-shaped connector shown in FIG. 6A.

Drain-back valve 200 may be installed in, for example, a housing or side-wall of a check valve, a riser or drop pipe, or a connector that connects a check valve to a riser pipe or two riser pipe portions together. FIGS. 6A-6C illustrate one example of a drain-back valve 200 installed in a T-shaped connector 600. T-shaped connector 600 may include a connector body 602. Connector body 602 includes a main passageway 604 having an inlet 606, and outlet 608 and a peripheral inner surface 610 circumferentially disposed around a central axis of connector body 602. Connector body 602 may also include a bypass port 620.

Drain-back valve 200 may be positioned or inserted into bypass port 620. In one embodiment, drain-back valve 200 may be, for example, rigidly mounted or inserted into bypass port 620. Alternatively, drain-back valve 200 may be screwed into bypass port 620. In this example, external threads 212 of drain-back valve body 210 engage or mate with threads 622 on the inside surface of bypass port 620. As illustrated in FIGS. 6B and 6C, end cap 230 faces the exterior of connector body 602 and plunger 262 of plunger assembly 260 extends radially inward into passageway 604 towards and through central longitudinal axis 630 of connector body 602.

Figure 7A:
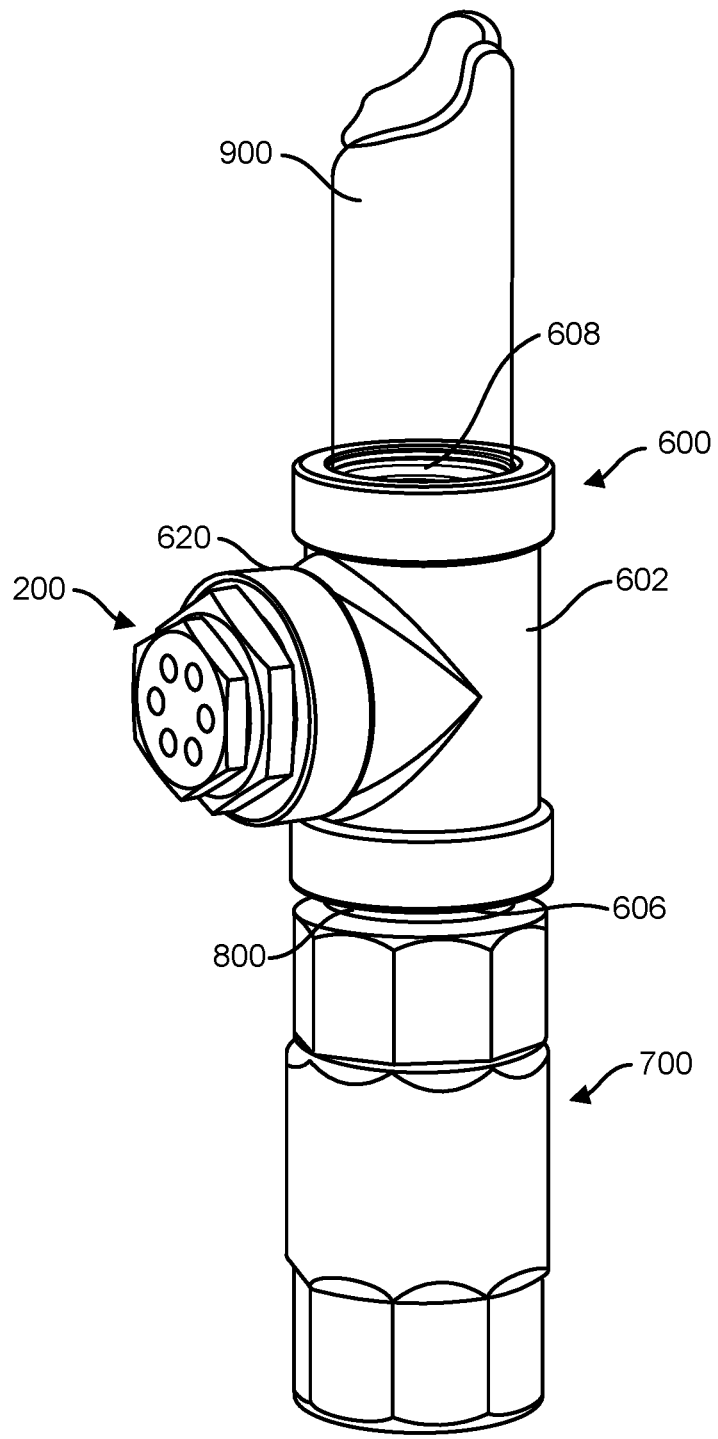
FIG. 7A depicts a perspective view of the T-shaped connector incorporating the drain-back valve shown in FIG. 6A-6C connected to a check valve.
Figure 7B:
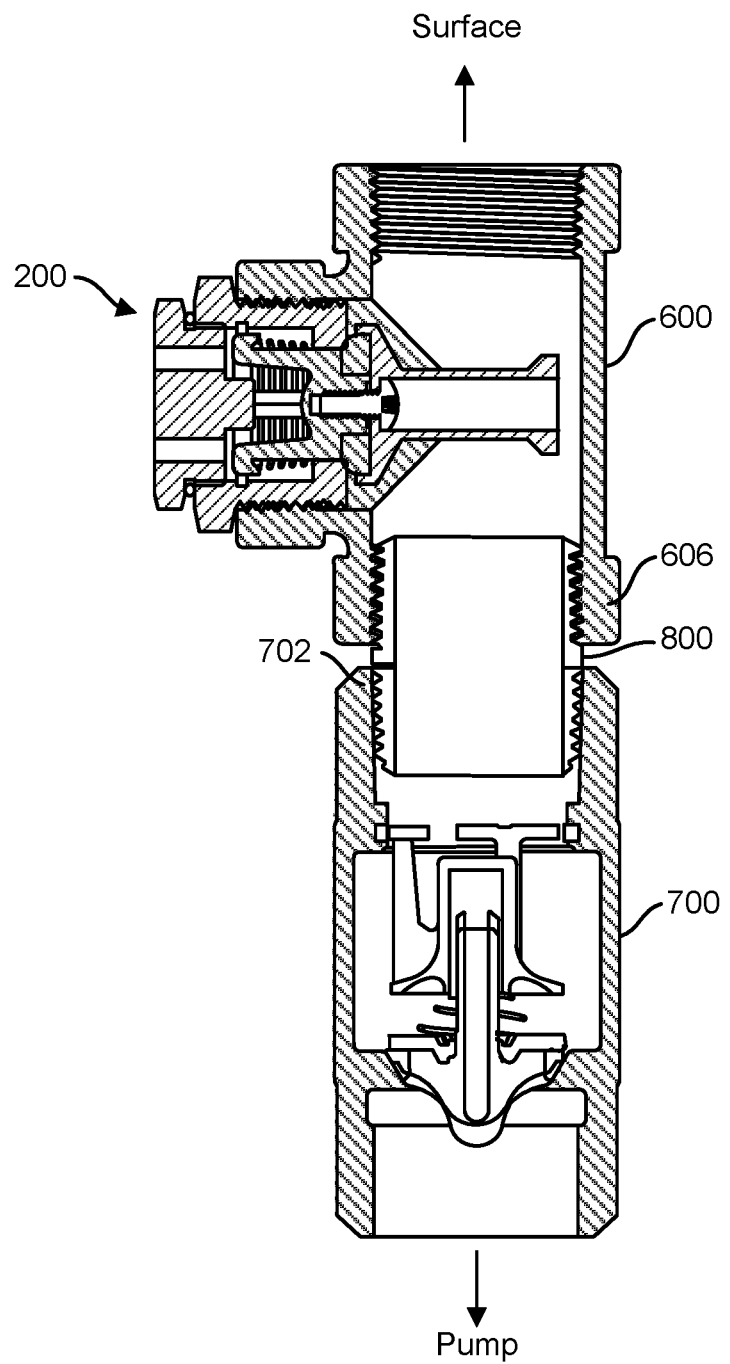
FIG. 7B depicts a cross-sectional view of the T-shaped connector and the check valve shown in FIG. 7A.

FIGS. 7A and 7B illustrate one example of the placement or positioning of drain-back valve 200 within a water well pump system. In this embodiment, connector 600 may be installed vertically in a water well pump system. Connector 600 is connected at one end near inlet 606 to, for example, a check valve 700 and at the opposing end near outlet 702 to a riser or drop pipe (not shown). In one example, a short riser pipe section 800 may be disposed between connector 600 and check valve 700.

Check valve 700 may be, for example, similar to conventional check valve 100 including a main poppet valve assembly 180 described above and illustrated in FIGS. 1A-1B (without the break-off plug). Alternative check valve configurations or other valve structures known in the art may be used in place of check valve and main poppet valve assembly that prevent fluid flow in a closed position and allow fluid flow in an open position to protect the pump. For example, alternative embodiments of such valve assemblies include those described in U.S. Pat. Nos. 4,129,144, 4,971, 093, 5,176,171, 6,581,633, 9,032,992 and 9,163,737 or valve available from Flomatic Corporation of Glens Falls, N.Y. under the designation 80DI VFD, which are hereby incorporated herein by reference.

In an alternative embodiment, drain-back valve 200 may be installed or screwed into bypass port 130 of valve body 120 of check valve 100 to allow fluid to drain out of the upstream portion of check valve 100 and into the well. In yet another embodiment, drain-back valve may be installed or screwed into a bypass port formed in the outer wall of a riser or drop pipe to allow fluid to drain out of the riser of drop pipe and into the well.

A drain-back valve constructed in accordance with one or more aspects of the present invention prevents fluid from flowing out of, for example, a connecter, check valve, or riser or drop pipe, or well system component in which it is installed when in the closed position and allows fluid to flow or drain back into the well when it is an open position. In the embodiments described herein, drain-back valve 200 is activated when a weight 170 is dropped down into a water well riser or drop pipe 160. When weight 170 strikes plunger 262, rubber disk 280 is dislodged from end 222 allowing fluid to flow into passageway 214 of body 210 through inlet 216 and out outlet 218 through the plurality of ports 232 in cap 230. As water flow out the plurality of ports 232 in cap 230, water in the drop or riser pipe 160 drains back into the well. This allows the pump service person on the ground surface to pull up the submersible pump without the water weight that was in the drop or riser pipe 160. This configuration also makes it easier and safer as no water will be spilled on the surface around the well preventing potential cross-contamination of the water well. In addition, the pump service professional will not be soaked by the water from each string of pipe when they are un-threaded and filled with water.

After withdrawn from the well and before reinsertion, drain-back valve 200 may be reset by, for example, re-aligning plunger assembly 260 with drain-back valve body 210 by sealingly re-engaging rubber disk 280 with end 222 of drain-back valve body 210 that will prevent fluid flow into drain-back valve passageway 214. A drain-back valve constructed in accordance with one or more aspects of the present invention does not have to be replaced each time a pump is pulled from a well for servicing.

A drain-back valve assembly constructed in accordance with one or more aspects of the present invention may be installed below the frost line in a water well drop pipe inside the well casing or, alternatively, in the water well drop pipe below or at the well's static water level.

While embodiments of the invention have been illustrated and described in detail in the disclosure, the disclosure is to be considered as illustrative and not restrictive in character. All changes and modifications that come within the spirit of the invention are to be considered within the scope of the disclosure.

The invention claimed is:

1. A drain-back valve, said drain-back valve comprising: a body, said body including a passageway and a central longitudinal axis, the passageway including an inlet, an inlet end forming a valve seat, an outlet, and a peripheral inner surface;
    an end cap, said end cap inserted into the outlet of said body, said end cap including at least one port extending through the end cap and in fluid communication with the passageway;
    a plunger assembly, the plunger assembly including a central longitudinal axis, a portion of the plunger assembly extending through the inlet of said body and into the passageway, the plunger assembly moveable between a closed position that prevents fluid flow through the inlet of said body and an open position that allows fluid flow through the inlet to the outlet of said body, said plunger assembly including:
    a plunger guide, the plunger guide positioned substantially within the passageway of the drain-valve body, the plunger guide including a head and a base extending from the head towards the outlet of said body, the plunger guide being biased away from the inlet end of said body;
    a plunger, the plunger including a first end and a second end, the first end of the plunger affixed to the head of the plunger guide, the second end of the plunger extending outward from the inlet end of said body; and
    a rubber disk, the rubber disk positioned between the head of the plunger guide and the first end of the plunger, the rubber disk biased against the valve seat formed on the inlet end of said body in the closed position, at least a portion of the rubber disk being dislodged from the valve seat formed on the inlet end of said body in the open position.

2. The drain-back valve of claim 1, wherein said body is inserted into a bypass port formed in an outer wall of a component in a water well pump system.

3. The drain-back valve of claim 2, wherein the bypass port is formed in the outer wall of a connector pipe of the water well pump system.

4. The drain-back valve of claim 2, wherein the bypass port is formed in the outer wall of a check valve of the water well pump system.

5. The drain-back valve of claim 2, wherein the bypass port is formed in the outer wall of a riser pipe.

6. The drain-back valve of claim 2, wherein said body is screwed into the bypass port.

7. The drain-back valve of claim 1, wherein the central longitudinal axis of said body aligns with the central longitudinal axis of said plunger assembly in the closed position.

8. The drain-back valve of claim 7, wherein the central longitudinal axis of said body is misaligned with the central longitudinal axis of said plunger assembly in the closed position.

9. The drain-back valve of claim 1, wherein said rubber disk is biased against the valve seat formed on the inlet end of said body in the closed position by a spring, the spring is disposed within the passageway of said body, the spring having a first end and a second end, the first end of the spring positioned against a portion of the inner surface of said body proximate the inlet, the second end of the spring positioned against a portion of said plunger guide.

10. The drain-back valve of claim 1, wherein the end cap is screwed into the outlet of said body.

11. The drain-back valve of claim 1, wherein the end cap includes a plurality of ports.

12. The drain-back valve of claim 1, wherein said plunger extends radially inward from a bypass port formed in an outer wall of a connector pipe into a passageway of the connector pipe.

13. The drain-back valve of claim 1, wherein said plunger extends radially inward from a bypass port formed in an outer wall of a connector pipe into a passageway of the connector pipe.

14. The drain-back valve of claim 1, wherein said plunger extends radially inward from a bypass port formed in an outer wall of a check valve into a passageway of the check valve.

15. The drain-back valve of claim 1, wherein said plunger extends radially inward from a bypass port formed in an outer wall of a riser pipe into a passageway of the riser pipe.

16. The drain-back valve of claim 1, wherein said rubber disk includes a radiused edge that contacts the valve seat in the closed position.

17. A method of removing a submersible pump system from a well, the submersible pump system including a submersible pump connected to a riser pipe, said method comprising:

providing a drain-back valve within the submersible pump system, the drain-back valve positioned between the submersible pump and above-ground, the drain-back valve including:

a body, said body including a passageway and a central longitudinal axis, the passageway including an inlet, an inlet end forming a valve seat, an outlet, and a peripheral inner surface;

an end cap, said end cap inserted into the outlet of said body, said end cap including at least one port extending through the end cap and in fluid communication with the passageway;

a plunger assembly, the plunger assembly including a central longitudinal axis, a portion of the plunger assembly extending through the inlet of said body and into the passageway, the plunger assembly moveable between a closed position that prevents fluid flow through the inlet of said body and an open position that allows fluid flow through the inlet to the outlet of said body, said plunger assembly including:

a plunger guide, the plunger guide positioned substantially within the passageway of the drain-valve body, the plunger guide including a head and a base extending from the head towards the outlet of said body, the plunger guide being biased away from the inlet end of said body;

a plunger, the plunger including a first end and a second end, the first end of the plunger affixed to the head of the plunger guide, the second end of the plunger extending outward from the inlet end of said body into a passageway of the submersible pump system; and a rubber disk, the rubber disk positioned between the head of the plunger guide and the first end of the plunger, the rubber disk biased against the valve seat formed on the inlet end of said body in the closed position, at least a portion of the rubber disk being dislodged from the valve seat formed on the inlet end of said body in the open position;

turning off the submersible pump;

dropping a weight down the passageway of the submersible pump system, the weight contacting the plunger of said plunger assembly and dislodging the rubber disk from the valve seat formed on the inlet end of said body to open said drain-back valve, wherein water flows through the body of said drain-back valve and out the at least one port of the end cap into the well;

removing the submersible pump system from the well.

18. The method of claim 17, wherein said drain-back valve is inserted into a bypass port formed in a connector.

19. The method of claim 16, wherein the drain-back valve is inserted into an outer wall of a check valve.

20. The method of claim 16, wherein the drain-back valve is inserted into an outer wall of a riser pipe.

\* \* \* \* \*